United States Patent
Albouyeh et al.

(10) Patent No.: US 9,882,979 B2
(45) Date of Patent: Jan. 30, 2018

(54) IMAGE FILE TRANSMISSION

(71) Applicant: INTERNATIONAL BUSINESS MACHINES CORPORATION, Armonk, NY (US)

(72) Inventors: Shadi E. Albouyeh, Raleigh, NC (US); Jeffrey R. Hoy, Southern Pines, NC (US); Stephanie L. Trunzo, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 14/658,641

(22) Filed: Mar. 16, 2015

(65) Prior Publication Data
US 2016/0277492 A1    Sep. 22, 2016

(51) Int. Cl.
| G06F 17/30 | (2006.01) |
| G06F 17/22 | (2006.01) |
| G06F 17/27 | (2006.01) |
| G06F 7/00 | (2006.01) |
| H04L 29/08 | (2006.01) |

(52) U.S. Cl.
CPC .... H04L 67/1078 (2013.01); G06F 17/30265 (2013.01); G06F 17/30905 (2013.01); H04L 67/02 (2013.01); H04L 67/2823 (2013.01)

(58) Field of Classification Search
CPC  G06F 17/30905; H04L 67/02; H04L 67/2823
See application file for complete search history.

(56) References Cited

U.S. PATENT DOCUMENTS

| 6,686,930 | B2 | 2/2004 | Powers et al. |
| 6,944,821 | B1 | 9/2005 | Bates et al. |
| 7,468,731 | B2 | 12/2008 | Eldridge et al. |
| 8,042,065 | B2 | 10/2011 | Wong et al. |
| 2004/0133635 | A1* | 7/2004 | Spriestersbach .. G06F 17/30905 709/203 |
| 2009/0024664 | A1* | 1/2009 | Benbunan Garzon ............. G06F 17/30905 |
| 2009/0157741 | A1 | 6/2009 | Cheng et al. |
| 2011/0047506 | A1 | 2/2011 | Miller |
| 2012/0005608 | A1 | 1/2012 | Wong et al. |

(Continued)

FOREIGN PATENT DOCUMENTS

EP    1577769 A3    9/2005

OTHER PUBLICATIONS

IBM, "Method and system to Paste and Copy", IP.com, IPCOM000177579D, Dec. 18, 2008, pp. 1-6.

*Primary Examiner* — Nicholas Taylor
*Assistant Examiner* — Ho Shiu
(74) *Attorney, Agent, or Firm* — Law Office of Jim Boice

(57) ABSTRACT

A method transmits an image file to a target electronic device. One or more processors convert an original image file from a first format into a second format to create a converted image file. A locator address metatag is appended to the converted image file. The locator address metatag provides an address of a copy of the original image file in the first format. The converted image file with the locator address metatag is transmitted, from a source electronic device to a target electronic device, such that the locator address metatag enables the target electronic device to locate and retrieve the copy of the original image file.

19 Claims, 5 Drawing Sheets

(56) References Cited

U.S. PATENT DOCUMENTS

2012/0026193 A1* 2/2012 Higeta .............. G06F 17/30274
　　　　　　　　　　　　　　　　　　　　　　345/637
2015/0350360 A1* 12/2015 Wu .................... H04L 67/2823
　　　　　　　　　　　　　　　　　　　　　　709/203

* cited by examiner

IMAGE FILE TRANSMISSION

BACKGROUND

The present disclosure relates to the field of electronic communication devices, and specifically to the use of electronic communication devices that are capable of transmitting image files. Still more particularly, the present disclosure relates to providing an ability to dynamically manage image files that are transmitted from a source electronic device to a target electronic device.

SUMMARY

In an embodiment of the present invention, a method and/or computer program product transmits an image file to a target electronic device. One or more processors convert an original image file from a first format into a second format to create a converted image file. A locator address metatag is appended to the converted image file. The locator address metatag provides an address of a copy of the original image file in the first format. The converted image file with the locator address metatag is transmitted, from a source electronic device to a target electronic device, such that the locator address metatag enables the target electronic device to locate and retrieve the copy of the original image file.

In an embodiment of the present invention, a hardware device comprises a camera, a processor, a computer readable memory, and a non-transitory computer readable storage medium. First program instructions are for converting an original image file from a first format into a second format to create a converted image file, where the original image file was created by the camera. Second program instructions are for appending a locator address metatag to the converted image file, where the locator address metatag provides an address of a copy of the original image file in the first format. Third program instructions are for transmitting, from the hardware device to a target electronic device, the converted image file with the locator address metatag, such that the locator address metatag enables the target electronic device to locate and retrieve the copy of the original image file. The first, second, and third program instructions are thus stored on the non-transitory computer readable storage medium for execution by one or more processors via the computer readable memory.

DETAILED DESCRIPTION

Figure 1:
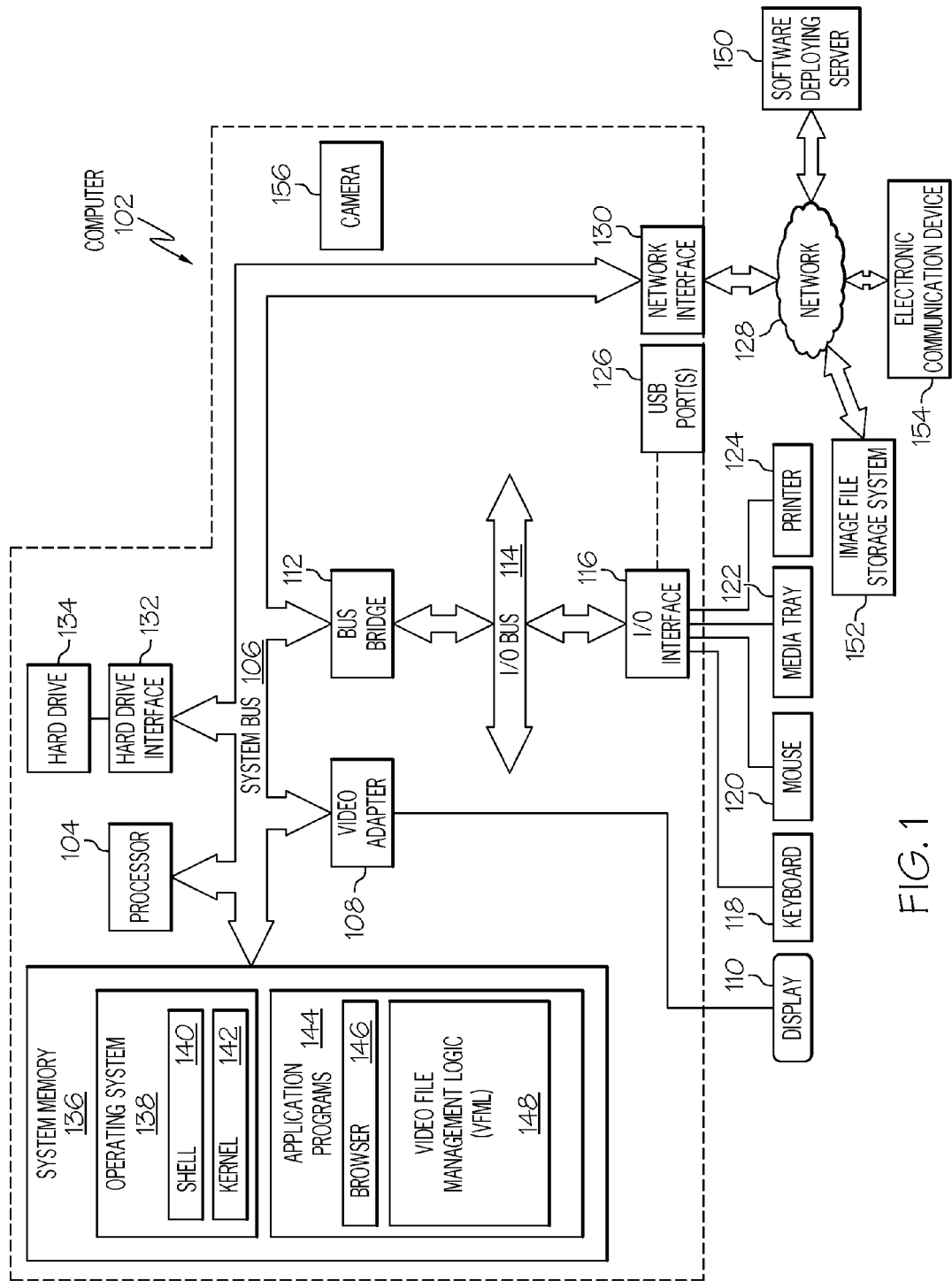
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150 and/or image file storage system 152 and/or electronic communication device 154 shown in FIG. 1, as well as source electronic device 202, target electronic device 254, and/or supervisory system 210 shown in FIG. 2.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a video file management logic (VFML) 148. VFML 148 includes code for implementing the processes described below, including those described in FIGS. 2-5. In one embodiment, computer 102 is able to download VFML 148 from software deploying server 150, including in an on-demand basis, wherein the code in VFML 148 is not downloaded until needed for execution. In one embodiment of the present invention, software deploying server 150 performs all of the functions associated with the present invention (including execution of VFML 148), thus freeing computer 102 from having to use its own internal computing resources to execute VFML 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Lossless compression algorithms reduce a file size of an image file while preserving a perfect copy of the original uncompressed image. That is, by using a compression algorithm such as that used to create a .ZIP file, all information from the original uncompressed image can be reconstructed. However, this reconstruction requires time, resources, and bandwidth of the device that is receiving the compressed image file.

Lossy compression algorithms construct a representation of the original uncompressed image using a degraded copy of the original image file. The image created by the file constructed by a lossy compression algorithm often has less acuity/resolution that the original image. Thus, while lossy compression preserves bandwidth and minimizes resources of the receiver, a lower-resolution image is created.

The present invention provides a system that provides the ability to receive a lossy (reduced information) image, thus reducing communication bandwidth requirements, but still allows the receiver to access the original (complete information) image. As described herein, the present invention transmits an image file that is the result of a lossy compression, but includes a metatag that allows the recipient of the image file to retrieve the original full-scale image file, if so desired. Thus, while received lower resolution images satisfy many of the needs of the recipient, the recipient is still able to retrieve the high resolution original image file if so desired.

Figure 2:
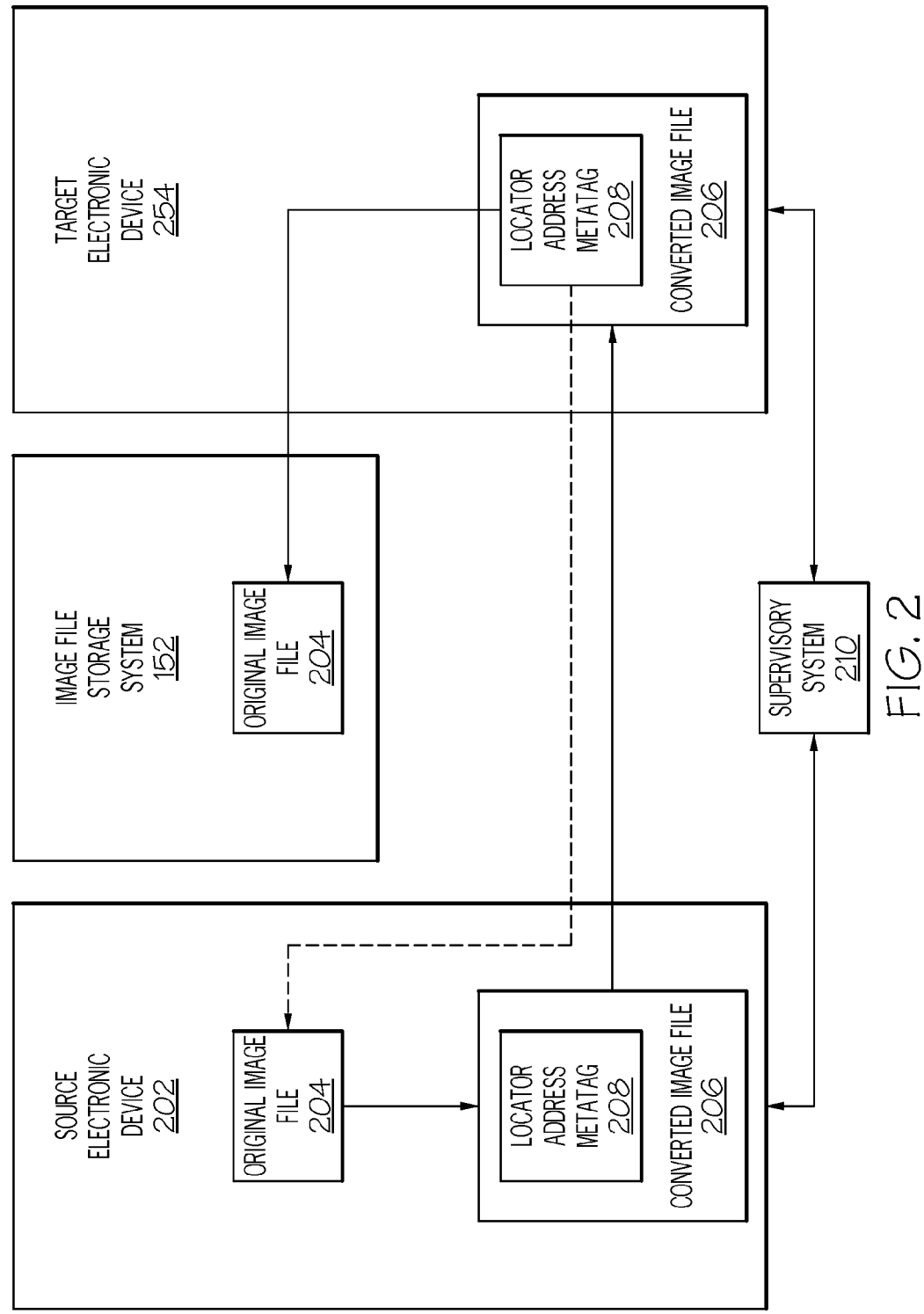
FIG. 2 illustrates a relationship between a source electronic device and a target electronic device that receives a converted image file generated from an original image file by the source electronic device.

With reference now to FIG. 2, a relationship between a source electronic device 202 and a target electronic device 254 that receives a converted image file 206 generated from an original image file 204 by the source electronic device 202 is depicted.

As shown in FIG. 2, source electronic device 202 (which is analogous to computer 102 shown in FIG. 1) may be a portable computing device such as a laptop computer, a tablet computer, etc., or a stationary computing device such as a desktop computer or a server, or a communication device such as a "smart" phone, etc. As depicted in FIG. 2, source electronic device 202 has access to an original image file 204. The original image file 204 may be stored within the source electronic device 202 (e.g., within a hard drive such as hard drive 134 shown in FIG. 1), or it may be stored in a remote storage location such as the image file storage system 152 shown in FIG. 1.

Source electronic device 202 is able to convert the original image file 204 from one format into another format, thus resulting in the converted image file 206. The first format may be any format from various imaging formats, including but not limited to Joint Photographic Experts Group (JPEG), Tagged Image File Format (TIFF), Graphics Interchange Format (GIF), Bitmap image files (BMP), Portable Document Format (PDF), etc. The second format used by the converted image file 206 may similarly be in any format from various image formats, including but not limited to JPEG, TIFF, GIF, BMP, PDF, etc. In one or more embodiments of the present invention, the first and second formats are different formats. For example, the original image file 204 may be in JPEG, while the converted image file 206 is in PDF. Alternatively, the first and second formats are a same format, but in a lossy form. That is, the original image file 204 may be a 5 MB JPEG file, while the converted image file 206 is also a JPEG file, but is only 1 MB in size. This reduction in size is accomplished by decreasing the resolution (i.e., number of pixel data bits) or image quality (i.e., compression settings) found in the converted image file 206.

In an embodiment of the present invention, pluggable image conversion modules at the system level are provided by applications, web services, and/or the system developer to the user, thus allowing the user to go to system settings and configure the conversion that is to be done. For example, assume that a drop-down menu is presented to the user offering various conversion options. These options include the format into which the original image file 202 will be converted (e.g., JPEG, TIFF, GIF, BMP, PDF, etc.), and/or the desired size range of the converted image file 206 (e.g., between 0.1 and 0.5 megabytes).

While the choice of which format/size to use in creating the converted image file 206 may be manually chosen by the user, in one embodiment image format/size requirements are retrieved from a web-enabled repository. For example, a supervisory system 210 may provide a web-based resource for controlling the image conversion process. The supervisory system 210 (or a website hosted by the supervisory system 210) has access to information that describes software and/or hardware resource availability in the target electronic device 254. That is, system information maintained by the operating system of the source electronic device 202 provides information regarding the processor speed, input/output network bandwidth, system bus bandwidth, memory availability, etc. of software and hardware resources within the target electronic device 254. Based on this system information about resources in the target electronic device 254, logic (e.g., part of VFML 148 shown in FIG. 1) determines which format/size is to be used when creating the converted image file 206, and so instructs the source electronic device 202. Alternatively, settings/recommendations/directions from the web-enabled repository are set manually by a systems expert.

In an embodiment of the present invention, the format and/or size of the converted image file 206 may be determined (e.g., by the supervisory system 210) based on what program will be incorporating the converted image file 206. For example, a particular text messaging application may be able to handle only JPEG files that are less than 0.5 MB in size, while an e-mail messaging application may be able to handle PDF files that are over 3.0 MB in size. Thus, the type of application that will be receiving the converted image file 206 will determine the format and/or size of the converted image file 206.

In one embodiment of the present invention, the size of the converted image file 206 is time dependent. For example, assume that historical data shows that a particular type of communication device, which may utilize some or all of the architecture of target electronic device 254, increases the size of image files that it can handle by 15% per year. That is, assume that historical data shows that, for this particular type of communication device, network speeds have increased, applications have become more efficient, available network bandwidth has expanded, etc., such that the size of image files that this particular type of communication device can handle under nominal conditions has risen by 15% per year. Thus, at year 1, the maximum size of the converted image file 206 that can be handled by this particular type of communication device may be 100 kilobytes. At year 2, the maximum size of the converted image file 206 that can be handled by this particular type of communication device would then be 115 kilobytes (100× 1.15). At year 3, the maximum size of the converted image file 206 that can be handled by this particular type of communication device would be 132 kilobytes (115×1.15), etc. As shown in FIG. 2, the converted image file 206 includes a locator address metatag 208, which provides an address/pointer/locator to a copy of the original image file, or in one embodiment, the original image file 204 itself, assuming that it is still intact after the conversion process that created the converted image file 206. That is, the converted image file 206 may be created from a copy of the original image file 204 that is dynamically created during the conversion process, or a copy of the original image file 204 may be created as the original image file 204 is consumed by the conversion process. In either embodiment, the locator address metatag 208 provides information needed to locate and retrieve the original image file 204 (or an unaltered copy thereof).

The converted image file 206 is transmitted from the source electronic device 202 to the target electronic device 254 (analogous to the electronic communication device 154), as shown in FIG. 2. The target electronic device 254 may be any type of electronic device (e.g., a tablet computer, a laptop computer, a desktop computer, etc.) capable of receiving the converted image file 206 (e.g., via an Ethernet connection, a Wi-Fi network, etc.). In one embodiment, the target electronic device 254 is a mobile communication device such as a smart phone that communicates over a cellular network.

As shown in FIG. 2, once the target electronic device 254 has the converted image file 206, it is able to extract the locator address metatag 208 from the converted image file 206. The locator address metatag 208 provides an address/URL/etc. that enables the target electronic device 254 to locate and retrieve the original image file 204 (or an exact and faithful copy thereof). The target electronic device 254 can then execute the original image file 204 to produce a high-quality image from the original image file 204, which may have more information/detail than the image generated from the converted image file 206. As described herein, retrieving the original image file 204 is optional, based on input received from the target electronic device 254.

Figure 3:
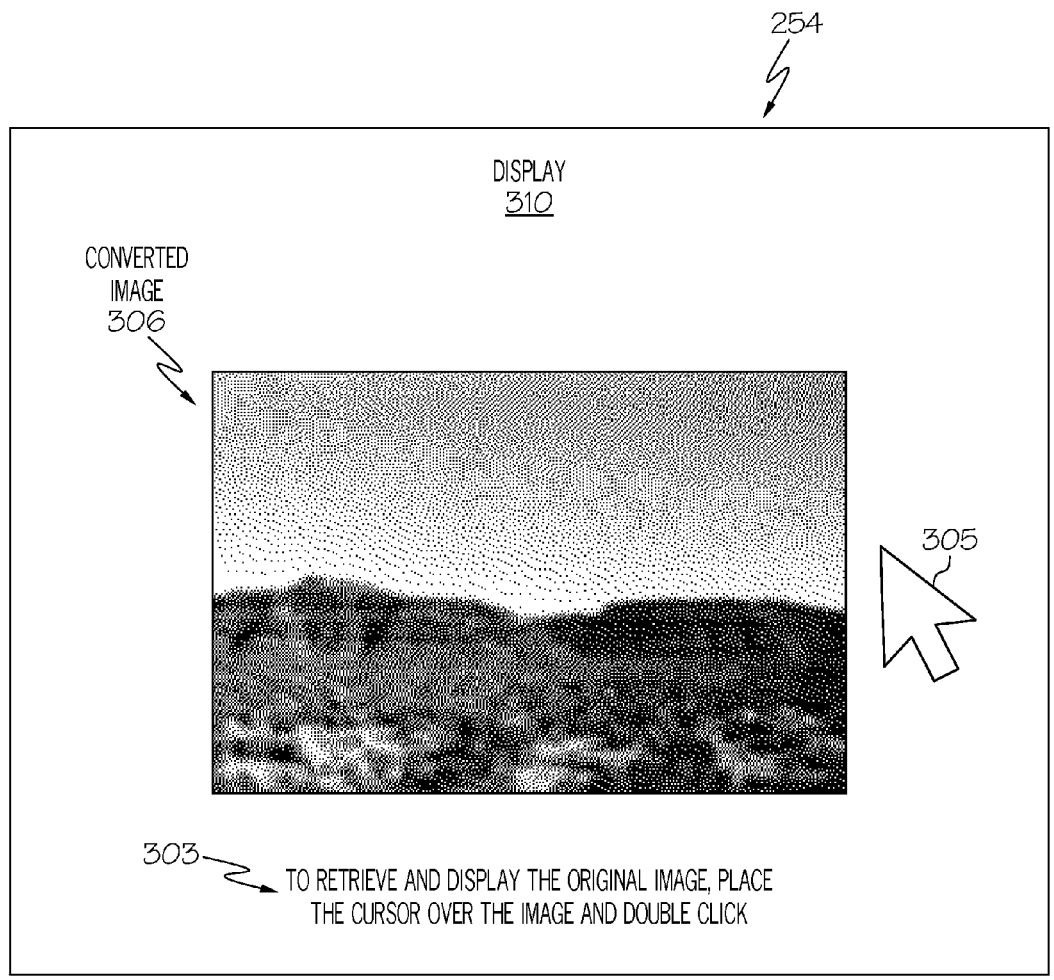
FIG. 3 depicts a converted image from the source electronic device being depicted on a display of the target electronic device depicted in FIG. 2.

For example, consider FIG. 3, in which a display 310 on the target electronic device 254 generates a converted image 306 using the received converted image file 206 shown in FIG. 2. As depicted in FIG. 3, the resolution of converted image 306 is poor, due to the reduced size of the converted image file 206, poor data translation from one format (e.g., JPEG) to another format (e.g., PDF), etc. However, the user of the target electronic device 254 is given an option in field 303 to obtain the original photo/image/file. As shown in field 303, the user is instructed to place cursor 305 over the converted image 306 and double click (or otherwise generate a signal indicating the desire to obtain a copy of the original image/photo) the mouse. This causes the user's computer to retrieve the original image file (e.g., element 204 in FIG. 2), from which a high-resolution image (i.e., the original image) can be generated.

Figure 4:
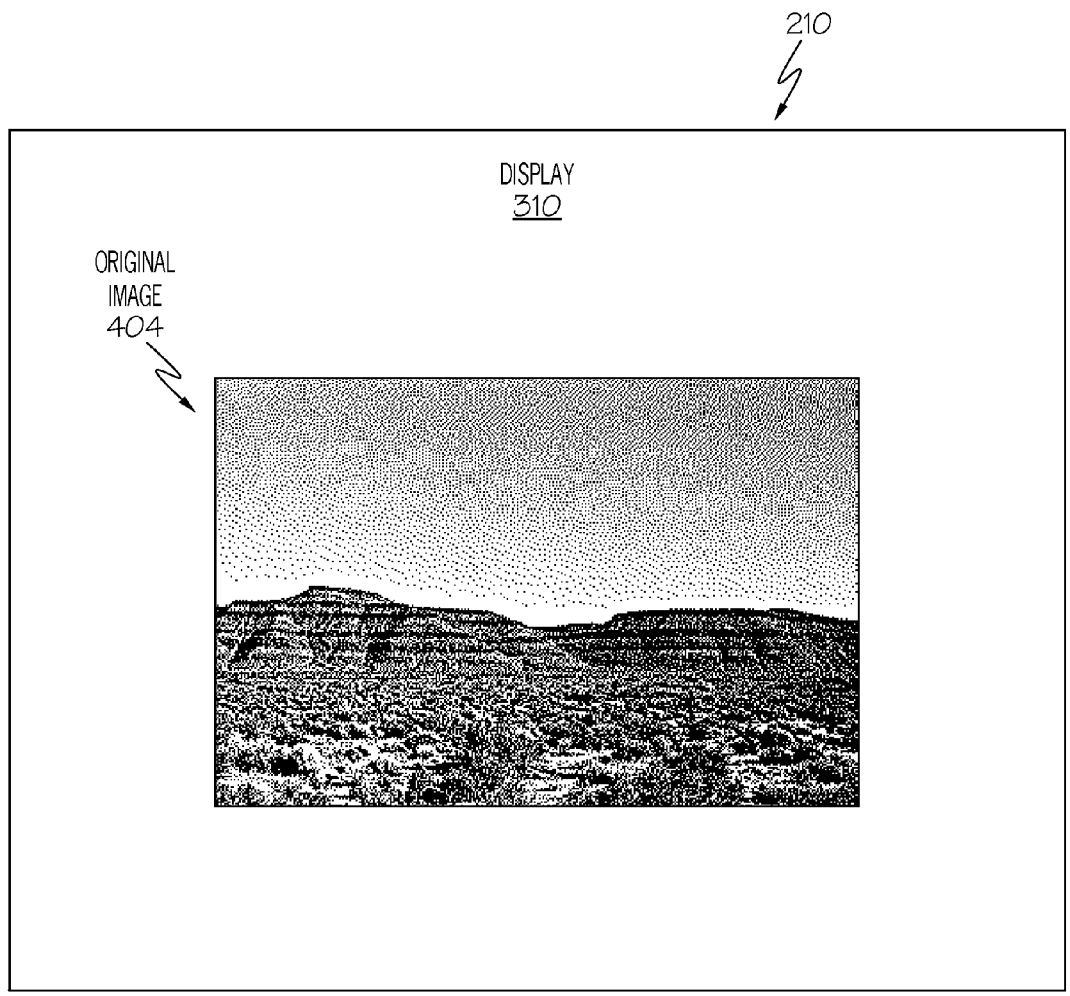
FIG. 4 illustrates an original image, from which the converted image was created, that has been retrieved from the target electronic device depicted in FIG. 2 using a locator address metatag that has been appended to the converted image file.

As shown in FIG. 4, the action described in FIG. 3 results in the generation of an original image 404, which is created by executing the original image file 204 that is retrieved using the embedded locator address metatag 208 found in the previously received converted image file 206 (see FIG. 2). Note that the clarity/resolution of the original image 404 is much better than the converted image 306 shown in FIG. 3, since the original image file 204 used to generate the original image 404 is larger, has not be compromised/corrupted by being converted from a first format to a second format, etc.

Figure 5:
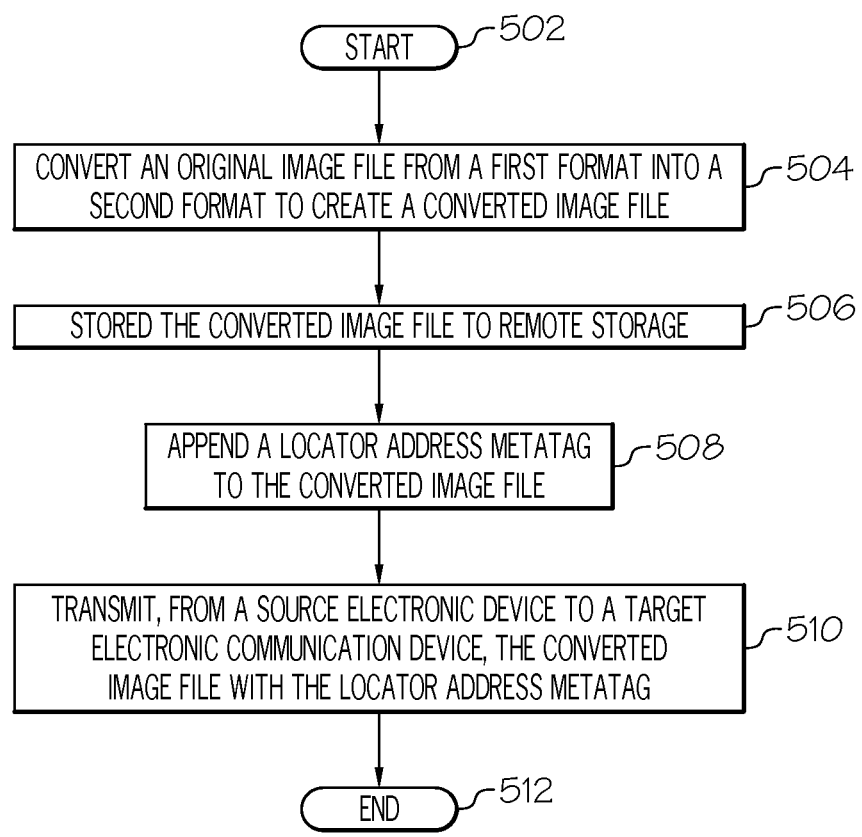
FIG. 5 is a high-level flow chart of one or more steps performed by a processor to transmit an image file according to one or more embodiments of the present invention.

With reference now to FIG. 5, a high-level flow chart of one or more steps performed by a processor to transmit an image file according to one or more embodiments of the present invention is presented.

After initiator block 502, one or more processors (e.g., from the source electronic device 202 shown in FIG. 2) converts an original image file (e.g., element 204 shown in FIG. 2) from a first format into a second format to create a converted image file (e.g., element 206 in FIG. 2), as described in block 504.

In one embodiment of the present invention, the first format and the second format are actually the same format (e.g., JPEG), but are of different sizes. For example, the first format may be for a 5 MB JPEG file, while the second format may be a 1 MP JPEG file, which is smaller and consumes less transmission bandwidth, but produces a lower-resolution image.

In one embodiment of the present invention, the first format and the second format are different formats. For example, the first format may be a JPEG format, and the second format is a PDF format. Thus, the original image file is converted from JPEG to PDF, which may result in a loss of resolution/clarity of the image when depicted as a PDF image.

In one embodiment of the present invention, the first format was used when the original image file was first created. For example, the first format may be in the JPEG format, which was used by a camera (e.g., camera 156 shown in FIG. 1) that created the original image file.

As shown in block 506, the converted image file is then stored in a remote location, such as the image file storage system 152 shown in FIG. 2. This allows non-source electronic devices, including the target electronic device 254 in FIG. 2, to access the original image file 204, without compromising the security/integrity of the source electronic device 202.

As shown in block 508 of FIG. 5, one or more processors append a locator address metatag (e.g., element 208 in FIG. 2) to the converted image file. As described in FIG. 2, the locator address metatag provides an address of a copy of the original image file (or the original file itself) in the original format that was used when the original image file was created.

As described in block 510 of FIG. 5, a source electronic device (e.g., element 202 in FIG. 2) transmits the converted image file with the locator address metatag to a target electronic device (e.g., element 254 in FIG. 2). The locator address metatag enables the target electronic device to locate and retrieve the copy of the original image file, thus enabling it to reproduce a true and faithful image that was captured by the original image file.

The converted image file may be transmitted to the target electronic device as an attachment to an e-mail, an attachment to a text message, an attachment to a document in a communication, and/or embedded directly into any of such communications. That is, the converted image file and/or the image created therefrom may be part of the body of the communication, or it may be a file that is attached to the communication, which must be opened and executed in order for the image to be generated.

The flow-chart of FIG. 5 ends at terminator block 512.

Determining which second format to use when converting the original image file 204 in FIG. 2 into the converted image file 206 depends on properties of the target electronic device 254 in one or more embodiments of the present invention.

For example, in an embodiment of the present invention, the source electronic device determines a processor capacity of the target electronic device. This determination may be made by sending a query to the target electronic device, which asks the target electronic device's boot firmware to respond with universal unique identifiers (UUIDs) that describe components found in the target electronic device. For example, the target electronic device may have a certain CPU, a particular input/output processor, a specific graphics co-processor, etc., each of which has a nominal throughput (i.e., is designed to provide a certain throughput of instruction execution). For example, assume that the target electronic device uses a graphics co-processor (found in the video adapter 108 shown in FIG. 1, assuming that some or all of the architecture for computer 102 is used by a target electronic device 254 shown in FIG. 2). Assume further that the graphics co-processor in the target electronic device is designed to execute X instructions per second. The source electronic device may determine, based on parameters of different formats, that format A will work well with this graphics co-processor, but format B will overtax this graphics co-processor. Thus, the source electronic device will convert the original image file into format A.

Furthermore, the decision regarding which format to use to convert the original image file into the converted image file may be based on a record of real-time or historical processor capacity. For example, a dashboard and/or monitoring sensors (found within the video adapter 108 shown in FIG. 1) within the target electronic device may monitor and record performance of a processor, such as the graphics co-processor. If the graphics co-processor only has free capacity to execute 0.5× instructions per second, historically and/or in real time, then format A may not be appropriate, and a less bandwidth-demanding format C may be required.

Once the appropriate format (A, B, or C) is selected by the source electronic device, then that format is used to convert the original image file into the converted image file.

In an embodiment of the present invention, the parameters of components in the target electronic device used to determine which second format to use when converting the original image file into the converted image file include the memory capacity of the target electronic device. For example, the design of memory (system memory, storage memory, cache memory, etc.) used in the target electronic device will determine which format is to be used when converting the original image file into the converted image file. For example, if a first target electronic device has only Y megabytes of system memory, and format D requires more than Y megabytes of system memory to work properly, then format D will not be used for converted image files that are sent to the first target electronic device. However, a second target electronic device may have Z megabytes of system memory, which is sufficient for format D to work properly. Thus, converted image files sent to the second target electronic device may use format D. As with the processor parameters described above, the memory capacity of the target electronic device(s) may be static (e.g., by interrogating UUIDs found in the operating system/boot firmware), or dynamic (e.g., by receiving a record of memory availability from system monitoring devices in the target electronic device).

In an embodiment of the present invention, the second format is based on the display size of an electronic display found on the target electronic device. For example, if the target electronic device only has a 3"×4" display, then a low-resolution format (e.g., using a small file size, such as 500 KB) may be adequate to provide excellent resolution of the image on the display. However, the user of the target electronic device 254 is still given the option (as described in FIG. 3) of obtaining the larger original image file, in order to display it using a projector that is attached to the target electronic device, to print the image on a large format printer, etc. In an embodiment of the present invention, a hardware device may include a camera, such as the camera 156 shown in FIG. 1. The camera may be coupled to the system bus 106, and/or the I/O bus 114, and/or the I/O interface 116, depending on hardware and/or software contained within the camera 156. This camera 156 creates the original image file 204 shown in FIG. 2. Thus, in an exemplary embodiment the hardware device includes a camera, at least one processor, a computer readable memory, and a non-transitory computer readable storage medium. Various program instructions are stored on the non-transitory computer readable storage medium for execution by one or more processors via the computer readable memory. Such program instructions include, but are not limited to: first program instructions to convert an original image file from a first format into a second format to create a converted image file, where the original image file was created by the camera; second program instructions to append a locator address metatag to the converted image file, where the locator address metatag provides an address of a copy of the original image file in the first format; and third program instructions to transmit, from the hardware device to a target electronic device, the converted image file with the locator address metatag, where the locator address metatag enables the target electronic device to locate and retrieve the copy of the original image file.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of transmitting an image file, the method comprising:
    converting, by one or more processors, an original image file from a first format into a second format to create a converted image file;
    appending, by one or more processors, a locator address metatag to the converted image file, wherein the locator address metatag provides an address of a copy of the original image file in the first format;
    transmitting, from a source electronic device to a target electronic device, the converted image file with the locator address metatag, wherein the locator address metatag enables the target electronic device to locate and retrieve the copy of the original image file; and
    wherein the target electronic device has a history of increasing, after each iteration of a predefined time period, a size of an image file that it is capable of receiving and processing, and wherein the method further comprises:
    determining, by the source electronic device, an initial size of an image file that the target electronic device was able to receive and process at an initial time;
    determining, by the source electronic device, a number of the predefined time periods that have transpired since the initial time; and
    adjusting, by the source electronic device, a size of image files that are sent from the source electronic device to the target electronic device based on the number of the predefined time periods that have transpired since the initial time.

2. The method of claim 1, further comprising:
    determining, by the source electronic device, a processor capacity of the target electronic device; and
    selecting, by the source electronic device, the second format based on the processor capacity of the target electronic device.

3. The method of claim 1, further comprising:
    determining, by the source electronic device, a memory capacity of the target electronic device; and
    selecting, by the source electronic device, the second format based on the memory capacity of the target electronic device.

4. The method of claim 1, further comprising:
    determining, by the source electronic device, a display size of the target electronic device; and
    selecting, by the source electronic device, the second format based on the display size of the target electronic device.

5. The method of claim 1, wherein the first format was used when the original image file was first created.

6. The method of claim 1, wherein the image file is a photograph file.

7. The method of claim 1, wherein the converted image file is smaller than the original image file.

8. The method of claim 1, wherein the address of the copy of the original image file is a physical address in memory in the source electronic device.

9. The method of claim 1, wherein the original image file is of an image, and wherein the converted image file is executable on the target electronic device in order to display the image in the second format on the target electronic device.

10. The method of claim 9, further comprising:
    receiving, by the source electronic device, an original image selection signal from the target electronic device, wherein the original image selection signal causes the source electronic device to transmit the original image file to the target electronic device.

11. The method of claim 10, wherein the original image selection signal is caused by the user double clicking over the image being displayed in the second format on the target electronic device.

12. The method of claim 1, wherein the source electronic device and the target electronic device are communicatively coupled by a supervisory system, wherein the supervisory system controls what types of image files are sent from the source electronic device to the target electronic device, and wherein the method further comprises:
    determining, by the supervisory system, what type of program on the target electronic device will be utilizing an image file from the source electronic system; and
    selectively transmitting, from the supervisory system to the target electronic device, either the original image file or the converted image file based on the type of program on the target electronic device that will be utilizing the image file from the source electronic system.

13. A computer program product for transmitting an image file, the computer program product comprising a computer readable storage medium having program code embodied therewith, the program code readable and executable by a processor to perform a method comprising:
    converting an original image file from a first format into a second format to create a converted image file;
    appending a locator address metatag to the converted image file, wherein the locator address metatag provides an address of a copy of the original image file in the first format;
    transmitting, from a source electronic device to a target electronic device, the converted image file with the locator address metatag, wherein the locator address metatag enables the target electronic device to locate and retrieve the copy of the original image file; and
    wherein the target electronic device has a history of increasing, after each iteration of a predefined time period, a size of an image file that it is capable of receiving and processing, and wherein the method further comprises:
  determining, by the source electronic device, an initial size of an image file that the target electronic device was able to receive and process at an initial time;
  determining, by the source electronic device, a number of the predefined time periods that have transpired since the initial time; and
  adjusting, by the source electronic device, a size of image files that are sent from the source electronic device to the target electronic device based on the number of the predefined time periods that have transpired since the initial time.

14. The computer program product of claim 13, wherein the method further comprises:
  determining, by the source electronic device, a processor capacity of the target electronic device; and
  selecting, by the source electronic device, the second format based on the processor capacity of the target electronic device.

15. The computer program product of claim 13, wherein the method further comprises:
  determining, by the source electronic device, a memory capacity of the target electronic device; and
  selecting, by the source electronic device, the second format based on the memory capacity of the target electronic device.

16. The computer program product of claim 13, wherein the method further comprises:
  determining, by the source electronic device, a display size of the target electronic device; and
  selecting, by the source electronic device, the second format based on the display size of the target electronic device.

17. The computer program product of claim 13, wherein the first format was used when the original image file was first created.

18. The computer program product of claim 13, wherein the image file is a photograph file.

19. A hardware device comprising:
  a camera;
  a processor;
  a computer readable memory;
  a non-transitory computer readable storage medium;
  first program instructions to convert an original image file from a first format into a second format to create a converted image file, wherein the original image file was created by the camera;
  second program instructions to append a locator address metatag to the converted image file, wherein the locator address metatag provides an address of a copy of the original image file in the first format;
  third program instructions to transmit, from the hardware device to a target electronic device, the converted image file with the locator address metatag, wherein the locator address metatag enables the target electronic device to locate and retrieve the copy of the original image file; and wherein
  the first, second, and third program instructions are stored on the non-transitory computer readable storage medium for execution by one or more processors via the computer readable memory; and
  wherein the target electronic device has a history of increasing, after each iteration of a predefined time period, a size of an image file that it is capable of receiving and processing, and wherein the method further comprises:
  determining, by the source electronic device, an initial size of an image file that the target electronic device was able to receive and process at an initial time;
  determining, by the source electronic device, a number of the predefined time periods that have transpired since the initial time; and
  adjusting, by the source electronic device, a size of image files that are sent from the source electronic device to the target electronic device based on the number of the predefined time periods that have transpired since the initial time.

* * * * *